United States Patent [19]
Nettle

[11] Patent Number: 5,895,221
[45] Date of Patent: Apr. 20, 1999

[54] DUAL ACTION DOUBLE PENDULUM

[75] Inventor: James Edward Nettle, Carlsbad, Calif.

[73] Assignee: Bison Investments Ltd., St. Helier, United Kingdom

[21] Appl. No.: 08/921,443

[22] Filed: Aug. 29, 1997

[51] Int. Cl.⁶ .............................. G09B 23/10; F03G 3/06
[52] U.S. Cl. .............................. 434/302; 185/29
[58] Field of Search .............................. 434/302; 185/29; 33/391

[56] References Cited

U.S. PATENT DOCUMENTS

| | | | |
|---|---|---|---|
| D. 216,999 | 3/1970 | Kanbar | 434/302 |
| D. 217,912 | 6/1970 | Trippett et al. | 434/302 |
| D. 346,824 | 5/1994 | Mitchell et al. | 434/302 |
| 1,766,355 | 6/1930 | Redman | 434/302 |
| 3,339,292 | 9/1967 | Ruchlis | 434/302 |
| 3,594,925 | 7/1971 | Abbat | 434/302 |
| 4,422,530 | 12/1983 | Denton | 185/29 |
| 4,538,802 | 9/1985 | Van John | 434/302 |
| 4,615,022 | 9/1986 | Muramatsu | 367/179 |
| 4,738,032 | 4/1988 | Elmer | 33/392 |
| 5,145,378 | 9/1992 | Rott et al. | 434/302 |
| 5,158,462 | 10/1992 | Hones et al. | 434/302 |
| 5,377,433 | 1/1995 | Hazlehurst | 40/411 |

OTHER PUBLICATIONS

American Journal of Physics, ① Variable Mass Physical Pendulum—J.E. Kettler V63 pp. 1049–1051 Nov. '95. ② Double Pendulum: An Experiment in Chaos—Levin and Tan V61 pp. 1038–1044 Nov. '93. ③ Chaotic Pendulum, Based on Torsion and Gravity in Opposition–Peters V63 pp. 1128–1136 Dec. '95.

Primary Examiner—Robert A. Hafer
Assistant Examiner—Michael Priddy

[57] ABSTRACT

A double pendulum device displaying regular and chaotic behavior simultaneously when the pendulums are in motion, comprising: a beam (55) mounted symmetrically to a vertical surface about a pivot point consisting of a friction reducing insert (56) with a fastener (57) passing through it for attachment of the beam to said vertical surface and allowing free rotation of the beam (55) about its horizontal axis; a long pendulum (44) attached near one end of the beam (55) with a fastener (46) passing through a friction reducing insert (45) installed in and near one end of the long pendulum and a spacer (47), said long pendulum (44) being free to rotate about a horizontal axis; an arm (66) fixed at the opposite end of beam (55) from long pendulum (44) in such a manner as to become a ninety degree extension of beam (55) directionally equal to the long pendulum (44) when the pendulum device is static; a short pendulum (77) attached near the opposite end of the arm (66) from said arm's attachment to the beam (55) with a fastener (79) passing through a friction reducing insert (78) installed in and near the end of the short pendulum (77) and a spacer (80) that places the short pendulum (77) in the same vertical plane as the long pendulum (44), said short pendulum (77) being free to rotate around a horizontal axis; and the long pendulum (44), beam (55), arm (66), and short pendulum (77) each having sufficient mass to provide inertial power for a plurality of swings of the pendulum device after a starting force is applied, said pendulum device always having its beam (55) parallel to the ground when static.

6 Claims, 3 Drawing Sheets

DUAL ACTION DOUBLE PENDULUM

BACKGROUND—FIELD OF INVENTION

This invention relates to pendulums and their physical/mechanical properties.

BACKGROUND—DESCRIPTION OF PRIOR ART

Pendulums have a long and profound history both in science and in practical applications.

Practical applications have included time keeping, pendulum sawing or cutting devices, pendulum levels, pendulum timed machinery, and pendulum oriented testing equipment. Scientifically, a pendulum was used by Foucalt in 1851 to prove rotation of the Earth; and principles derived from the simple pendulum were used to develop modern navigation devices.

The sciences of physics and mechanics have used the pendulum in various forms to study and theorize regular and chaotic behavior in dynamical systems. To this end many different pendulums have been developed; such as: the double pendulum, the inverted pendulum, the periodically driven pendulum, the compound pendulum, the physically driven pendulum, the theoretical simple pendulum, and various others.

Pendulums display either regular or chaotic behavior when in motion; but have not displayed both behaviors simultaneously. Prime examples include the following:

(a) The pendulum in patent 5,145,378 to Rott and Smith, Nov. 29, 1990, displays regular or chaotic behavior.

(b) The pendulum in patent D346,824 to Mitchell, Aug. 12, 1992 displays chaotic behavior.

(c) All driven pendulums display either regular behavior, as in time keeping, or oscillate between regular and chaotic behavior, as in patent 4,422,530 to Denton, May 8, 1981.

Previously pendulums have been built with the train of thought that the pendulum device(s) are, or should be, in constant motion until all energy has dissipated. The absence of this limitation can allow different pendulum devices and behavior displays.

OBJECTS AND ADVANTAGES

Accordingly, several objects and advantages of this invention are:

(a) To provide a multi-pendulum device whose pendulums are physically different;

(b) to provide a display of regular pendulum behavior whenever that portion of the device is in motion, and simultaneously;

(c) to provide a display of chaotic pendulum behavior from the other pendulum portion of the device, whenever that portion is in motion.

Further objects and advantages are to provide a pendulum device that operates in complete silence; commences, returns to, and remains at rest in the same position; and when in motion is aesthetically pleasing to the eye. Still further objects and advantages will become apparent from a consideration of the ensuing description and drawings.

DRAWING FIGURES

Figure 1:
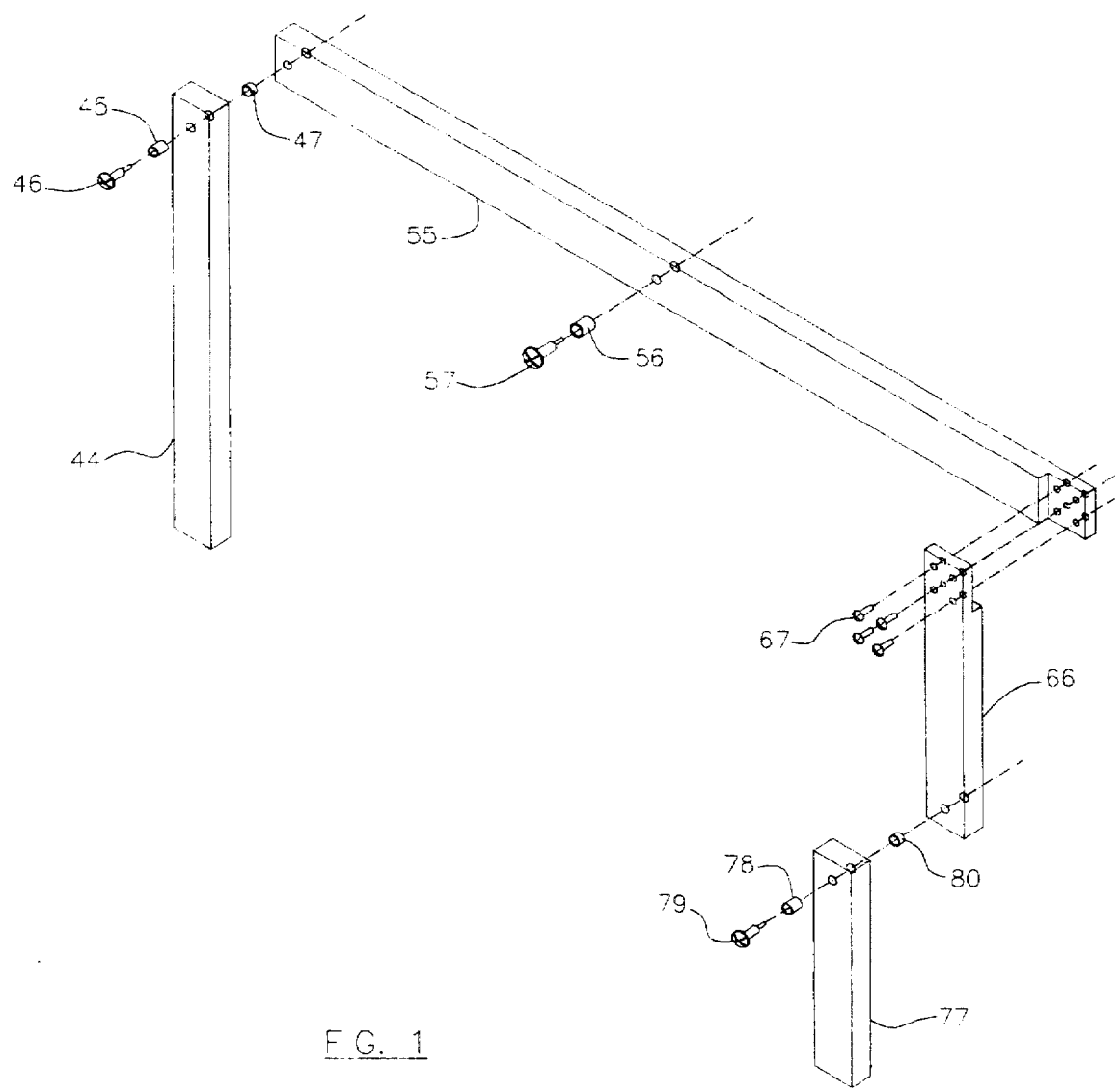
FIG. 1 is a perspective-exploded view of my invention.

| Reference Numerals in Drawings | | | |
|---|---|---|---|
| 44 | long pendulum | 45 | bearing |
| 46 | fastener | 47 | spacer |
| 55 | beam | 56 | bearing |
| 57 | fastener | 66 | arm |
| 67 | fastener | 77 | short pendulum |
| 78 | bearing | 79 | fastener |
| 80 | spacer | | |

SUMMARY

In accordance with the present invention a device comprised of a plurality of pendulums that displays regular and chaotic dynamical behavior simultaneously when in motion.

DESCRIPTION OF INVENTION

A typical embodiment of this pendulum device is illustrated in FIG. 1 in a perspective-exploded view. All the major components of the invention should be made of a material with sufficient mass or specific gravity to sustain motion as long as possible after the device has been put in motion. The major components consist of: beam 55, long pendulum 44, arm 66, and short pendulum 77.

Again referring to FIG. 1, a beam 55 is mounted symmetrically about a pivot point, that acts as a fulcrum, comprised of a bearing 56, and a fastener 57 that is flush to the surface of beam 55 and attaches beam 55 to a solid object in the vertical plane without allowing interference between beam 55 and the solid object.

Figure 2:
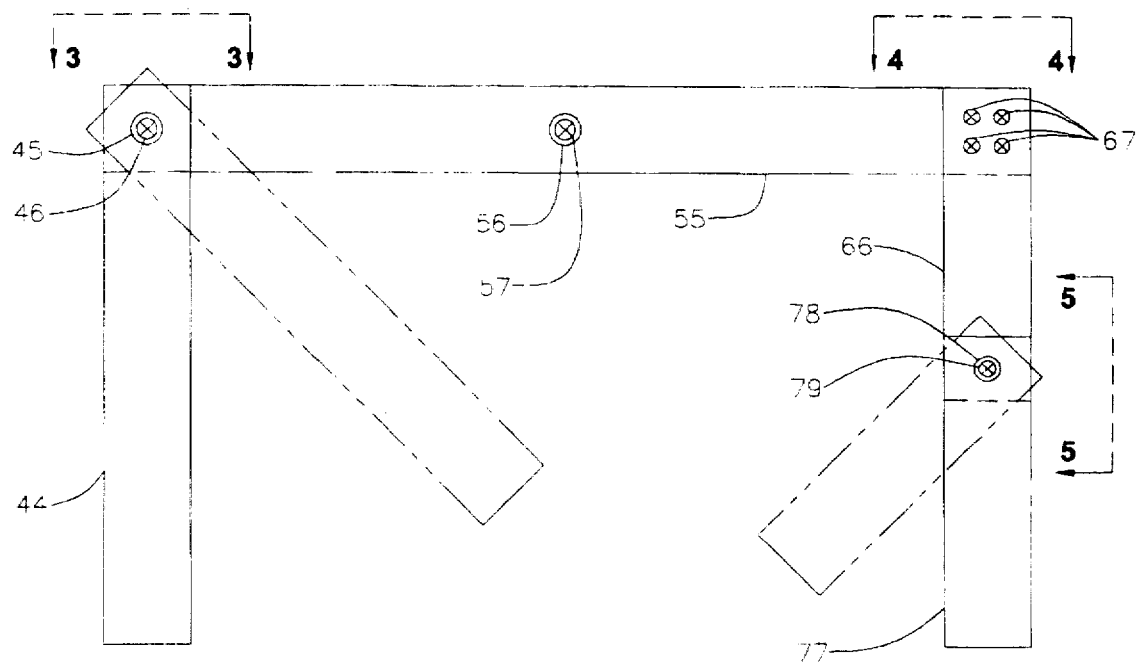
FIG. 2 is a front view of my invention.
Figure 3:
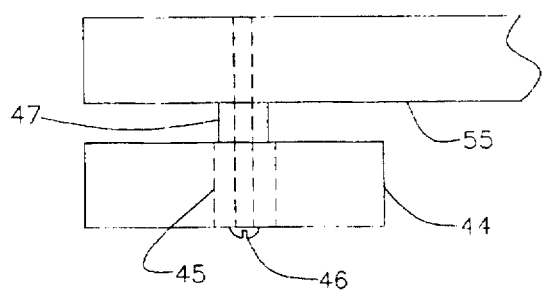
FIG. 3 is a view in detail of the portion indicated by the section lines 3—3 in FIG. 2.

A long pendulum 44 is attached near one end of the beam 55 with a fastener 46 that passes through a bearing 45 installed in the long pendulum 44, as depicted in FIG. 1 and FIG. 2. In FIG. 3 the actual attachment of the long pendulum 44 to the beam 55 is shown, which includes a spacer 47. Long pendulum 44 should be more than half as long, but not as long as, the beam 55 that it is attached on. The size and weight of bearing 45, fastener 46, and spacer 47 will vary, and are adjusted, so that the entire pendulum device rests, and after motion returns to rest, with beam 55 horizontal to the ground.

Figure 4:
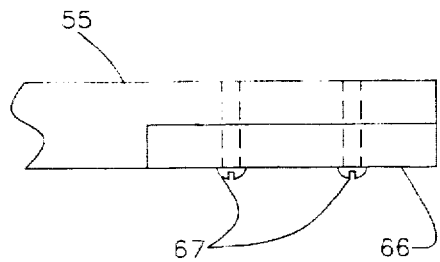
FIG. 4 is a view in detail of the portion indicated by the section lines 4—4 in FIG. 2.

In FIG. 1 and FIG. 2 an arm 66 is shown attached with fasteners 67 at the opposite end of the beam 55 from the long pendulum 44. The attachment of the arm 66 to the beam 55 is depicted in FIG. 4 and is done in a manner whereby arm 66 becomes a ninety degree extension of the beam 55. The length of arm 66 has to be over one half of the length of the long pendulum 44.

Figure 5:
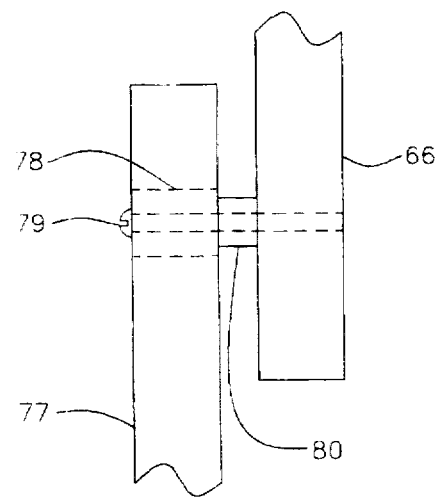
FIG. 5 is a view in detail of the portion indicated by the section lines 5—5 in FIG. 2.

A short pendulum 77 is attached near the opposite end of the arm 66 from its attachment to the beam 55, as shown in FIG. 1 and FIG. 2. FIG. 5 depicts the attachment of the short pendulum 77 to the arm 66; with a fastener 79 passing through a bearing 78 installed in the short pendulum 77 and a spacer 80. The spacer 80 should provide the same amount of clearance between the short pendulum 77 and the arm 66 that the spacer 47 provides between the long pendulum 44 and the beam 55 thereby placing both long pendulum 44 and short pendulum 77 in the same vertical plane. Short pendulum 77 is of the same length overall as the arm 66.

When the arm 66 and the short pendulum 77 are attached to each other, their length overall is equal to the long pendulum 44, as shown in FIG. 2. The distance between the attach point of the short pendulum 77 to the arm 66 and the opposite end of arm 66 has to equal one half of the length overall of the long pendulum 44.

It becomes evident that the above described pendulum device:

(a) is built in a unique configuration, (b) is technically two pendulums that are periodically driven by inertial forces, and (c) will provide a new and different display of pendulum behavior.

OPERATION OF INVENTION

Using or activating this pendulum device only requires moving any one of its moving parts (beam 55, long pendulum 44, or short pendulum 77) sufficiently enough to set the remaining two parts in motion.

As viewed in FIG. 2, the beam 55 can be set in motion by pushing up or down on its right-hand or left-hand side. The long pendulum 44 and the short pendulum 77 are set in motion by moving their lower, unattached end to the right or left, and releasing it to swing free.

It has been observed that the most dramatic display of regular and chaotic behavior produced by this pendulum device results from moving the long pendulum 44 to the right or the left, as viewed in FIG. 2, thirty degrees or more from its static position, and releasing to set the entire device in motion. The most subtle display of regular and chaotic behavior observed has been produced by moving the short pendulum 77 to the right or left, as viewed in FIG. 2, any distance before releasing to set the entire device in motion.

Once the entire pendulum device is in motion the long pendulum 44 will display regular behavior when swinging, and the short pendulum 77 will display chaotic behavior when swinging.

CONCLUSION, RAMIFICATION AND SCOPE OF INVENTION

Accordingly, the reader will see that the dual simultaneous behavior, regular and chaotic, of the pendulum device is unique physically and scientifically. Furthermore, the pendulum device has the additional advantages in that:

the amount of movement beheld, coupled with complete operational silence, is a curiosity unto itself, and the pendulum device always returns to the same position after consuming all inertial power and becoming static.

While the above description contains many specifications, these should not be construed as limitations on the scope of the invention, but rather as an exemplification of one preferred embodiment thereof. Many other variations are possible. For example, the major components can have other shapes, such as round, square, triangular, etc.; the major components can be made of various materials, such as wood, glass, steel, brass, ceramic, etc.; the pendulums can differ from each other in shape and style; the overall size of the major components and entire pendulum device can be increased or decreased proportionally as desired; and the member interconnecting the two pendulums can be of various shapes and/or sizes, etc.

Thus the scope of the invention should be determined not by the embodiment (s) illustrated, but by the appended claims and their legal equivalents.

I claim:

1. A balanced pendulum device able to display regular and chaotic behavior simultaneously, comprising:

(a) a beam of sufficient mass and length to provide inertial power in response to a starting force, (b) means for attaching said beam symmetrically to a vertical surface and allowing the beam to rotate freely about a horizontal axis, (c) a pendulum of predetermined length and mass, (d) means for attaching said pendulum near one end of the beam and allowing the pendulum to rotate freely about a horizontal axis, (e) an extension of predetermined length greater than one half the length of said pendulum, and predetermined mass, attached to said beam near the opposite end of the beam from said pendulum and extending from said beam at ninety degrees to said beam and in the same general direction as said pendulum, (f) a second pendulum of predetermined length equal to said extension, and predetermined mass, and (g) means for attaching said second pendulum near the lower end of said extension on the same vertical plane as said first pendulum and allowing said second pendulum to rotate freely about a horizontal axis, whereby said pendulum device displays regular behavior with one pendulum and chaotic behavior with its second pendulum when the pendulums are in motion.

2. The pendulum device of claim 1 wherein said pendulum device always operates silently.

3. The pendulum device of claim 1 wherein said beam of said pendulum is always horizontal to the Earth when static.

4. A balanced plurality of periodically driven interconnected pendulums, each exhibiting a different dynamically behavior simultaneously when in motion, comprising:

(a) two pendulums differing in size and mass, (b) a member to interconnect said two pendulums in two different horizontal planes and on the same vertical plane when the device is static, (c) means for attaching said two pendulums to said member with freedom to pivot about horizontal axes distal unto each other, and (d) means for attaching said member to a vertical surface with freedom to pivot about a horizontal axis, whereby a different dynamical behavior is displayed by each pendulum when in motion.

5. The device of claim 4 wherein said pendulums will individually stop and then resume their particular pendulous activity without any influence exterior said device.

6. The device of claim 4 wherein said device always operates silently.

* * * * *